W. CLOUD.
Devices for Preventing Retrograde Motion
in Machinery.
No. 148,179. Patented March 3, 1874.
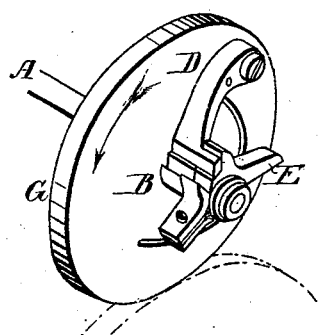
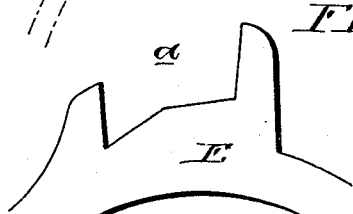
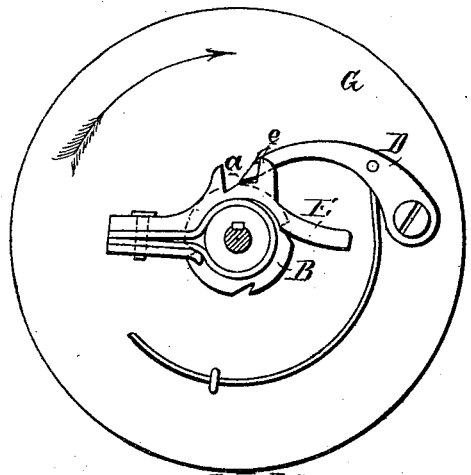 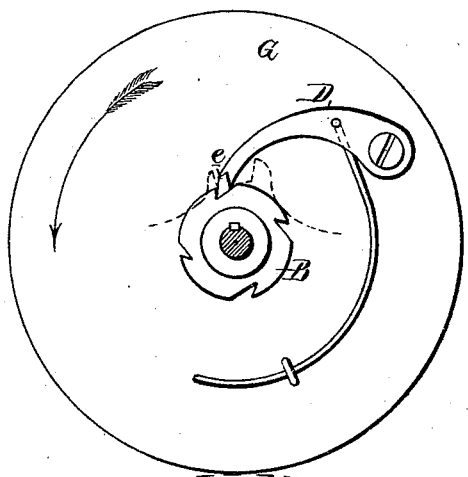
Witnesses, Wm A Steel, Harry Smith
William Cloud
By his Attys.
Howson and Son.

UNITED STATES PATENT OFFICE.

WILLIAM CLOUD, OF WEST CHESTER, PENNSYLVANIA.

IMPROVEMENT IN DEVICES FOR PREVENTING RETROGRADE MOTION IN MACHINERY.

Specification forming part of Letters Patent No. 148,179, dated March 3, 1874; application filed November 8, 1873.

*To all whom it may concern:*

Be it known that I, WILLIAM CLOUD, of West Chester, Chester county, Pennsylvania, have invented a new Mechanical Movement, of which the following is a specification:

The object of my invention is to prevent the driving-shaft A of a machine from being turned in the wrong direction, by combining with a driving wheel or pulley, G, hung loosely to the said shaft, a ratchet-wheel, B, secured to the said shaft, a spring-pawl, D, hung to the wheel or pulley, and a pawl-controlling device, E, as shown in the perspective view, Figure 1 of the accompanying drawing, so that when the wheel G is turned in the direction indicated by the arrow, the pawl will enter one of the notches of the ratchet and turn the shaft, and when the wheel is caused to revolve in a contrary direction, the pawl will be clear of the ratchet, and will consequently permit the wheel to be revolved without turning the shaft A, and without making the noise which accompanies ordinary ratchet mechanism.

The pawl-controlling device E consists of a bar adapted to the shaft, and clamped thereto by a strap, as shown in Fig. 2, so that the free movement of the bar on the shaft is slightly resisted by friction imparted by the clamp. In other words, the bar, although free to revolve on the shaft, is in such frictional contact therewith as to require a slight effort to turn it. The bar has a notch, *a*, deeper at one end than the other, as best observed in Fig. 2, and in the enlarged view, Fig. 4, and a lug, *e*, on the side of the pawl projects into this notch. When the wheel is turned in the direction of the arrow, Fig. 2, this projection *e* occupies a position in the shallowest portion of the notch *a*, and the pawl is clear of the notches in the ratchet-wheel; hence the wheel G can be turned freely on the shaft, and this without the usual rattling noise which accompanies the operation of an ordinary ratchet device.

On reversing the wheel G, as in Fig. 3, it will move to a slight extent without turning the shaft, and during this movement the projection *e* of the pawl will seek the deepest portion of the notch in the controlling device *a*, the latter being retarded by its friction during this preliminary movement of the wheel, and this deep portion of the notch *a* will permit the point of the pawl to enter one of the notches in the ratchet-wheel, and consequently the shaft must turn with the wheel G.

It is not essential that friction should be imparted to the pawl-controlling device by a strap, in the manner shown, for other well-known frictional mechanism may be employed to retard the movement of the controller on the shaft.

I claim as my invention—

The combination of a ratchet-wheel, B, spring-pawl D, and a pawl-controller, E, with the wheel or pulley G and shaft A, all substantially as described.

In testimony whereof I have signed my name to this specification in the presence of two subscribing witnesses.

WILLIAM CLOUD.

Witnesses:
   WM. WHITEHEAD,
   C. B. SHEPPARD.